Patented Nov. 8, 1949

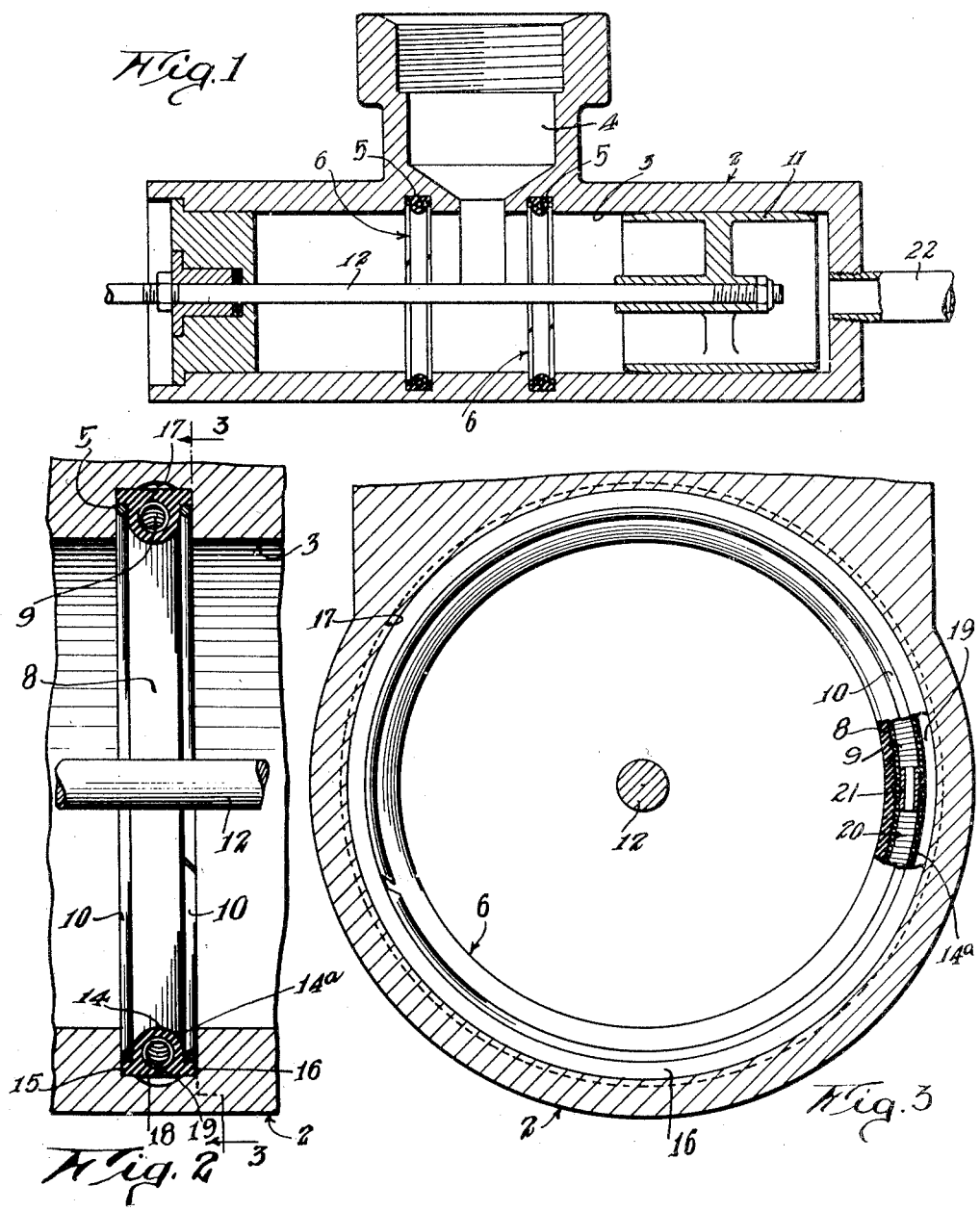

2,487,659

UNITED STATES PATENT OFFICE 2,487,659

SEALING DEVICE

Allan H. Lockheed, Arcadia, Calif.

Application November 18, 1946, Serial No. 710,435

2 Claims. (Cl. 286—14)

This invention relates to a sealing device for sealing the clearance between two circular parts, and refers particularly to a sealing device for closing the clearance between two relatively moving interfitting parts when operated under conditions which may result in the swelling of the material, or part of the materials, forming the sealing device.

The sealing device of the present invention has been found of particular value for use under conditions where a sealing device may be soaked with gasoline. When the conventional solid O or T ring is used, for example as a sealing means in a valve handling airplane fuel, these sealing rings become soaked with the fuel with the result that the rings swell and very seriously increase the resistive motion of the valve. When, for example a 1½ inch inside diameter solid sealing ring is soaked with aviation fuel for 168 hours the resulting swelling of the ring increases the inside diameter by between .035 to .040 inch. When a certain valve was inserted into such standard sealing ring the operating load required for moving the valve jumped from less than the permissible aviation standard of 10 inch pounds when unsoaked with gasoline, to over some 30 inch pounds after 168 hours of soaking in aviation fuel.

It is the general object of the present invention to provide a sealing ring which is designed and constructed so as to prevent undue swelling of the ring when soaked with fuel. Another difficulty experienced in the use of the conventional type of sealing rings, i. e., of the O or T type made of rubber or synthetic rubber compounds, arises from what is known as a tendency of such rings to undergo a compressibility set. By "compressibility set" I refer to the property of such rubber rings when compressed and left in the compressed condition and inactive for substantial periods of time to take a set and thus lose their pressure against the surfaces to be sealed.

A further object of the present invention is to provide a sealing device which will not take a compressibility set but which may be left in a compressed condition for protracted periods of time without losing pressure against the surfaces to be sealed.

The sealing device of the present invention is characterized by the fact that the body of the sealing member of the device is constructed hollow. By constructing the body hollow there is provided a reduction in the mass of material which can undergo swelling and accordingly the extent of swelling of the material is substantially reduced. Moreover by constructing the sealing member of the device hollow, part of the swelling action is absorbed while allowing a flow of material inwardly of the ring and thereby reducing the swelling which takes place on the outside of the ring. If all of the swelling takes place exteriorly of the ring, it results in decreasing the inside diameter of the ring. By means of the present invention I have produced, for example, sealing rings which undergo a change in inside diameter of only from between .010 to .012 inch when soaked for 168 hours in aviation fuel as contrasted with the change in inside diameter of .035 to .040 of a solid sealing ring, previously mentioned.

In order that the sealing ring of the present invention shall have the proper rigidity, and also in order to overcome the problem of compressibility set, there is provided within the hollow space of the sealing member a coil spring preferably wound under a pre-tension. This coil spring not only affords the desired rigidity but the pre-tension applied to the coil acts to insure the prompt return of the sealing ring to its designed diameter at all times and to prevent the ring from taking on a set having a different diameter than the intended designed diameter of the ring.

The sealing device of the present invention, together with various further objects and advantages of the invention, will be fully understood from the following description of the preferred form of a ring embodying the invention. For this purpose I have hereafter described such a preferred example of the invention in connection with the accompanying drawings, in which Figure 1 is a cross-sectional view of the sealing device installed in a groove of a cylinder for effecting sealing contact with an exterior annular surface of a member interfitting with the cylinder.

Figure 2 is an enlarged similar view, showing one sealing means.

Figure 3 is a section taken on the line 3—3 of Fig. 2.

In the drawings I have illustrated an embodiment of my invention in which the seal is used as part of a valve. As illustrated, the valve includes the cylindrical member 2 having a hollow interior 3 and having a lateral inlet 4. An outlet 22 is indicated for the member 2. The valve is to control the flow of fluid entering the inlet 4 into the member 2 and discharging to the outlet 22. At each side of the lateral inlet there is provided annular grooves 5 which contain the sealing devices 6 of the present invention. Since each of the grooves in the sealing devices is of like construction, only one thereof is described. The annular grooves are preferably substantially rectangular in cross-section but are provided with a slightly arcuate recess in their bases as indicated at 17. The sealing devices include the sealing members 8, coil springs 9 and retaining or snap rings 10. The sealing devices are intended to form a seal with the exterior wall of a cylindrical valve member 11 which is of sufficient length to bridge the space between the two sealing devices 6 and thus close off the flow of fluid from the inlet 4 into the bore 3 of the device. A rod 12 is indicated by which the valve member 11 may be moved for opening and closing the valve.

While the invention has been generally used as part of a valve it is obviously adapted for other uses. Moreover, while the sealing ring is indicated as installed in a groove in an external member for forming a sealing engagement with an internal member, reversal of the arrangement of parts can be made without departing from the principles of the invention.

The sealing member 8 is preferably formed of a soft, pliable resilient material, such as rubber, or rubber substitute, or imitation rubber. As illustrated in cross-section, the sealing member includes the body portion 14 of a more or less circular cross-section. At the base of the section the sealing member 8 is provided with laterally disposed shoulders 15 and 16. The laterally disposed shoulders 15 and 16 are of a width so that in an uncompressed position they are approximately equal to the width of the grooves 5. The body portion 14 of the sealing member 8 is hollow, there being provided the annular recess 14a substantially circular in cross-section, which may be formed to approach closely to the bottom flat wall 18 of the member 8. An annular slit 19 is provided, by means of which ingress may be made into the hollow space 14a of the sealing member 8.

The snap ring 10 may be of any usual or exterior type of split spring snap ring adapted for applying a pressure to the shoulders 15 and 16 of the member 8 for retaining the same within the groove of the member 2.

Within the opening 14a of the member 8 is mounted the ring 20. The ring 20 is formed by the coil spring 9 with its ends joined to form an endless ring, the coil spring forming the ring 20 being of a diameter substantially equal to that of the hollow space 14a. This coil spring is wound with a pre-tension, such, for example, as from 30% to 35% and it should be cut of an exact length so that when the ends are joined to form the ring 20 it provides a circular insert for the member 8, the inside diameter of which will maintain a slight centripetal pressure at all times so as to maintain the internal diameter of the sealing device as a whole at its designed value at all times. While various methods may be used for joining a coil spring into an endless ring, in the particular form shown there is provided a small tubular connecting member 21 which has exterior threads corresponding to the pitch of the spring 9, and the ends of the coils are threaded onto the connecting member 21. However, any other well-known means may be used. By the use of a coil spring having a substantial pre-tension, the ring imparts a distinct resistance to the alteration of the internal diameter of the sealing member which is effective to overcome the tendency of rings of this type to undergo a compressibility set. A further advantage of the use of a coil spring with a pretension therein is that it insures the prompt return of the sealing ring to its designed internal diameter after each movement of the valve member 11 away from contact with the ring.

The arcuate recess 17 on the face of the groove permits the sealing ring to easily expand radially when the valve member engages the sealing ring with a minimum cross-sectional deformation of the sealing ring. This contributes materially to a low operating load on the valve member of the device.

The sealing device illustrated may remain submerged in fuels, such as airplane fuel, without undergoing sufficient swelling to greatly increase the load required for moving the valve member 11 since the mass of rubber material which undergoes this swelling has been greatly reduced by providing the hollow space 14a therein.

While the particular example of the invention herein illustrated is well adapted for carrying out the objects of the present invention, various modifications and changes may be made, and this invention includes all the modifications and changes which come within the scope of the appended claims.

I claim:

1. A sealing device for sealing the space between two circular sectional members, one of which is provided with a groove for mounting the sealing device, said groove comprising a base wall and two side walls, said sealing device comprising a sealing member, a retaining ring for retaining the sealing member within said groove, and a tension member, said sealing member being hollow and having a shoulder adapted to simultaneously contact the bottom and side walls of said groove, the central portion of said shoulder being normally spaced from a portion of the base wall of said groove, and said tension member being in the form of a pre-tension coil spring joined into a ring and inserted in the hollow space of said sealing member normally urging the sealing member away from said groove, the coil spring filling said space so as to effectively impart a resistance to any change in the diameter of the sealing device.

2. A sealing device for sealing the space between two circular sectional members, one of which is provided with a groove for mounting the sealing device, said groove comprising a base wall and two side walls, said sealing device comprising a sealing member, a retaining ring for retaining the sealing member within said groove, and a tension member, said sealing member being hollow and having a shoulder adapted to simultaneously contact the bottom and side walls of said groove, and said tension member being in the form of a pre-tension coil spring joined into a ring and inserted in the hollow space of said sealing member normally urging the sealing member away from said groove, the coil spring filling said space so as to effectively impart a resistance to any change in the diameter of the sealing device.

ALLAN H. LOCKHEED.

REFERENCES CITED

The following references are of record in the file of this patent:

UNITED STATES PATENTS

| Number | Name | Date |
| --- | --- | --- |
| 1,855,897 | Taylor | Apr. 26, 1932 |
| 2,008,682 | Christenson | July 23, 1935 |
| 2,162,104 | Mosher | June 13, 1939 |
| 2,249,141 | Johnson | July 15, 1941 |
| 2,257,119 | Johannesen | Sept. 30, 1941 |